US005202892A

United States Patent [19]

Harwick

[11] Patent Number: 5,202,892

[45] Date of Patent: Apr. 13, 1993

[54] PULSE FORMING AND DELIVERY SYSTEM

[75] Inventor: John A. Harwick, Bluffton, S.C.

[73] Assignee: Kigre, Inc., Hilton Head Island, S.C.

[21] Appl. No.: 792,318

[22] Filed: Nov. 8, 1991

[51] Int. Cl.[5] .......... H01S 3/13

[52] U.S. Cl. .......... 372/30; 372/38; 372/29; 372/39; 372/33; 372/86

[58] Field of Search .......... 372/30, 38, 69, 29, 372/39, 82, 81, 33, 86

[56] References Cited

U.S. PATENT DOCUMENTS

| | | | |
|---|---|---|---|
| 4,768,198 | 9/1988 | Deki | 372/29 |
| 4,837,773 | 6/1989 | Wakata et al. | 372/38 |
| 4,856,012 | 8/1989 | Takenaka | 372/38 |
| 5,048,045 | 9/1991 | Noda et al. | 372/38 |
| 5,090,021 | 4/1992 | Nakatani et al. | 372/86 |

*Primary Examiner*—Georgia Y. Epps

*Attorney, Agent, or Firm*—Dykema Gossett

[57] ABSTRACT

A pulse forming and delivery system 10 is disclosed for forming and deliverying a pulse of electrical energy to a flashlamp 38. System 10 includes a capacitor 14 which is adapted to selectively store electrical energy from a power supply 16 and to transfer this electrical energy to flashlamp 38 when the gate portion of thyristor 12 is open. This gate portion is opened by controller 28. The total amount of light energy emanating from the laser and/or provided to flashlamp 38 is monitored by detector 42 and communicated to controller 22 by means of bus 44. When this total amount has exceeded a desired energy level, controller 22 prevents further electrical energy to be impressed upon switch controller 28 thereby, closing the gate portion of thyristor 12 and preventing any further transfer of energy to flashlamp 38.

13 Claims, 2 Drawing Sheets

PULSE FORMING AND DELIVERY SYSTEM

BACKGROUND OF THE INVENTION

1. Field of the Invention

This invention relates to a pulse forming and delivery system and, more particularly, to a method and an apparatus for selectively forming and delivering a pulse of electrical energy to a flashlamp, effective to cause the flashlamp to radiate light for a predetermined period of time.

2. Description of the Prior Art

Pulse forming and delivery systems are normally used in combination with a laser flashlamp and are effective to deliver a pulse of electrical energy to the lamp, in order to allow the lamp to radiate light for a predetermined period of time.

Many of these prior systems employ a capacitor and inductor, which were arranged to receive an electrical current and to properly form or shape the received current into a pulse, before inputting the shaped pulse to the flashlamp. This prior capacitor-inductor arrangement is very inflexible since there was only a single capactive and inductive value that produces a properly dampened pulse having the desired width and energy. This arrangement is therefore very inflexible since it requires a substitution of the capacitor and/or inductor elements everytime a different type of pulses is desired.

Moreover, these prior systems also have great difficulty in producing very wide square pulses. That is, to produce these types of pulses, these prior pulse delivery systems require several meshes of capacitors and inductors in order to achieve the needed overall inductive valve. This mesh arrangement not only results in high resistive loss, but is also relatively costly and prone to failure. Moreover, this prior mesh arrangement is also relatively inflexible and requires modification everytime the desired pulse width was to be changed.

Other types of prior pulse forming and delivery systems utilize a transistor arrangement in which many transistors are connected in parallel fashion in order to provide the necessary pulse shaping. These prior systems effectively form pulses having only a limited range of widths and do not allow for much variation in the widths of the formed pulses. Additionally, these prior transistor systems were also relatively inefficient, costly, and prone to failure.

Further, all of these prior pulse forming and delivery systems also normally employ a closed loop control technique which constantly measures the pulse energy emanating from the flashlamp, compares this measured value with a previously determined optimal value, and modifies the amount of energy delivered to the pulse forming and delivery system based upon this comparison. This feedback arrangement has been found to be inaccurate due to the inherent and compounded inaccuracy of the energy delivery modification. Moreover, this arrangement has also been found to be prone to failure and to be inefficient.

SUMMARY OF THE INVENTION

It is an object of this invention to provide a method and apparatus that allows a pulse of electrical energy to be formed and delivered to a laser flashlamp.

It is another object of this invention to provide a method and apparatus which utilizes a thyristor to selectively couple electrical energy to a laser flashlamp for a predetermined period of time.

It is another object of this invention to provide a microprocessor based method and apparatus which allows pulses of an arbitrary and selectable width and energy to be selectively formed and delivered to a laser flashlamp in order to allow the method and apparatus of this invention to be used in a wide range of applications while allowing the method and apparatus to be tailored, as needed, to meet the needs of very specific applications.

It is a further object of this invention to provide a pulse forming and delivery system in which the amount of energy emanating from or to a laser and or flashlamp is monitored and which prevents the further transfer of electrical energy to the flashlamp when the amount of the previously transferred electrical energy has reached or slight exceeded a desired and predetermined amount.

According to the teachings of a first embodiment of this invention a pulse forming and delivery system for use in combination with a flashlamp is provided. This system comprises capacitor means for storing electrical energy; thyristor means having an input coupled to the capacitor for allowing the stored electrical energy to be transferred from the capacitor means to the flashlamp; and controller means coupled to the thyristor means for allowing the thyristor means to only transfer the stored electrical energy to the flashlamp for a fixed period of time.

According to a second aspect of this invention, a method is provided for delivering a pulse of electrical energy to a flashlamp, the method comprising the steps of: providing a thyristor; coupling the cathode portion of the thyristor to the flashlamp; coupling the anode portion of the thyristor to a first source of electrical energy; coupling the gate portion of the thyristor to a second source of electrical energy for a predetermined period of time thereby, allowing a pulse of electrical energy, emanating from the first source of electrical energy to be formed and delivered to the flashlamp.

Further objects, features and advantages of the invention will become apparent from a consideration of the following description and claims, when taken in conjunction with the accompanying drawings.

BRIEF DESCRIPTION OF THE DRAWINGS

Various advantages of the present invention will become apparent to those skilled in the art by reading the following specification and by reference to the following drawings in which.

DETAILED DESCRIPTION OF THE INVENTION

Figure 1:
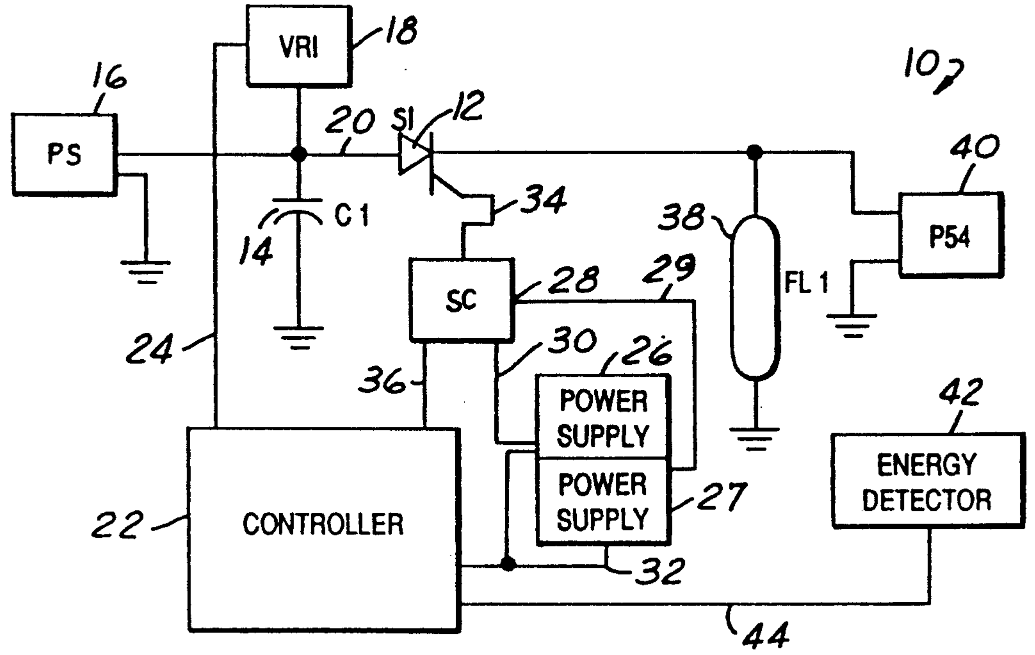
FIG. 1 is a block diagram of the pulse forming and delivery system made in accordance with the teachings of the preferred embodiment of this invention.
Figure 2:
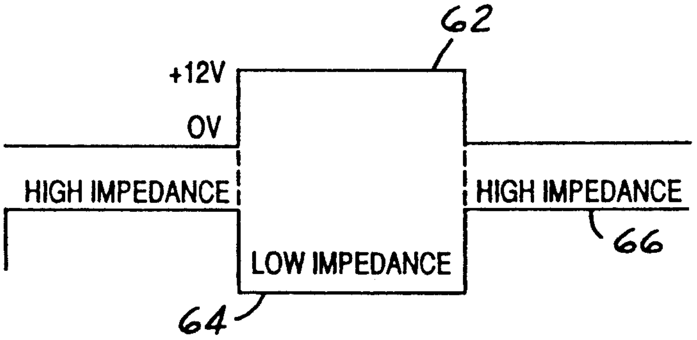
FIG. 2 describes the operation of the thyristor.

Referring now to FIG. 1, there is shown the pulse forming and delivery system 10 of the preferred embodiment of this invention. As shown, system 10 includes a thyristor 12 having an anode portion coupled to a capacitor 14, a power supply 16, and to a voltage regulator 18. As further shown, power supply 16 and capacitor 14 are also coupled to electrical ground.

In operation, power supply 16 is controlled by controller 22 via bus 32 and provides electrical energy to capacitor 14 by means of bus 20. This electrical energy is then stored by capacitor 14 and selectively delivered to thyristor 12 when the gate portion of the thyristor is opened. Moreover, regulator 18 monitors the amount of electrical energy stored by capacitor 14 and selectively "bleeds off" some of the stored energy in response to a command from system controller 22, communicated to regulator 18 by means of bus 24.

Further, system 10 also includes a second power supply 26 having an output coupled to a switching control device 28 by means of bus 30. Moreover, switch controller 28 is further coupled to the gate portion of thyristor 12 by means of bus 34 and is coupled to system controller 22 by means of bus 36.

System 10 further includes a third power supply 27 coupled to controller 28 by bus 29, and a laser flashlamp 38 which is coupled between the cathode output portion of thyristor 12 and electrical ground. Additionally, a power source 40 is coupled between flashlamp 38 and electrical ground and is adapted to provide a simmer current to flashlamp 38 in order to keep the flashlamp at a desired and predetermined low impedance state. Lastly, system 10 includes an energy detector 42 which is coupled to controller 22 by means of bus 44 and which is adapted to monitor the amount of light energy emanating from the laser and/or provided to flashlamp 38 and to communicate this monitored amount to controller 22.

In order to fully understand the operation of system 10, reference is now made to flow chart 50 which shows the sequence of operational steps performed by controller 22 during the operation of system 10.

Specifically, flow chart 50 includes an initial step 52 in which controller 22 is initialized or brought to a known state. Step 52 is then followed by step 54 in which an operator of system 10 inputs a desired amount of pulse width energy to be transferred to flashlamp 38 or emitted from the laser. Step 54 is then followed by step 56 in which a user of system 10, or alternatively controller 22, determines the amount of capacitive voltage needed on capacitor 14 in order to achieve the desired energy, associated with step 54. This energy is then transferred to capacitor 14 by power supply 16. Excess energy, that may be stored by capacitor 14, is then bled off by voltage regulator 18, acting under the control of controller 22.

Step 56 is then followed by step 58 in which a user of system 10, or alternatively controller 22, determines the needed or desired pulse width. This pulse width is then used in step 60, to determine the activation time associated with the switch controller 28.

Power supplies 26 and 27 supply the required voltages for controller 28 by use of busses 29 and 30. Controller 22 selectively activates or "turns on" thyristor 12 by use of bus 36, controller 28, and bus 34.

More particularly, a voltage signal of approximately +12 volts is placed onto bus 36 by controller 22. This signal causes controller 28 to output a signal of approximately +5 volts onto bus 34, thereby activating the gate of thyristor 12 and causing the delivery of energy to flashlamp 38. This flashlamp energy delivery continues as long as the voltage signal, from controller 22, is at a level of approximately +12 volts and is present on bus 36.

When controller 22 drives bus 36 to a low state, controller 28 emits a signal of approximately −15 volts onto bus 34 which inhibits the operation of thyristor 12, thereby stopping the transfer of energy to the lamp 38.

Moreover, it should be realized by one of ordinary skill in the art, that this voltage transfer from power supply 26 to the gate portion of thyristor 12, opens the gate of thyristor 12 and allows the stored electrical energy, from the capacitor 14, to be input to flashlamp 38 by means of bus 20. It should be further realized, that when the gate portion of thyristor 12 is closed, (i.e. when the power supply 36 is inhibited from placing energy onto bus 30), further electrical energy transfer from capacitor 14 to flashlamp 38 is prevented. Therefore, it should be apparent to one of ordinary skill in the art, that by controlling the duration of time that the output of power supply 26 is transferred to switch controller 28, one may control the duration and width of the output electrical energy impressed upon flashlamp 38. In this manner, a pulse of a given energy and width may be formed and delivered to flashlamp 38.

Therefore, step 60, of flow chart 50, is then followed by step 68 in which the power control switch 28 is activated for a predetermined period of time, substantially equal to the pulse width determined in step 58. This activation occurs by the generation of energy from power supply 26. Step 60 is then followed by step 70 in which controller 22 determines whether the activation time has been completed. If such time has not been completed, step 70 is followed by step 68. Alternatively, step 70 is followed by step 52. In this manner, many pulses of electrical energy may be intermittently formed and transmitted to flashlamp 38 in order to allow flashlamp 38 to intermittently produce pulses of light energy therefrom. Moreover, many different types of pulses may be easily formed and delivered to flashlamp 38 thereby allowing system 10 to be easily adapted to a wide range of applications.

Figure 3:
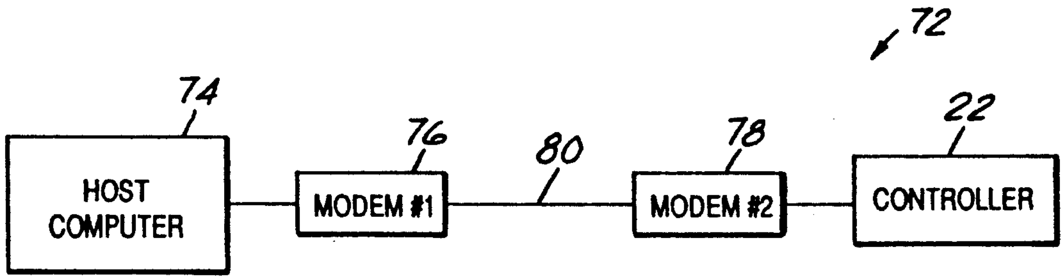
FIG. 3 is a block diagram illustrating the communicative connection between the system controller, of the preferred embodiment of this invention, and a host computer.
Figure 4:
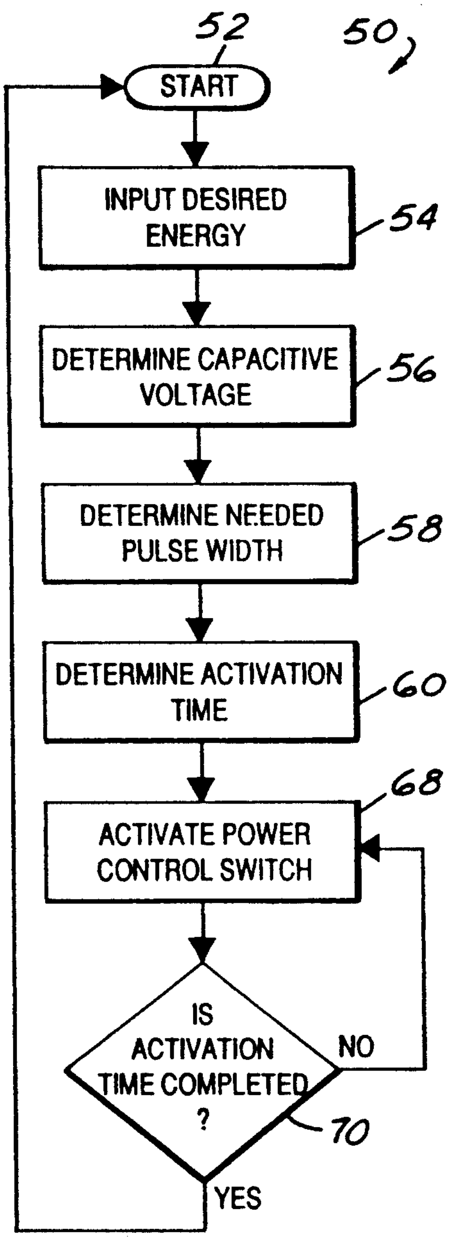
FIG. 4 is a flow chart illustrating a sequence of steps associated with the operation of the system controller of the preferred embodiment of this invention, as shown in FIG. 1.

Referring now to FIG. 3, there is shown an illustration 72 in which controller 22 is connected to a host computer 74 by means of modems 76 and 78 and communications line 80. In this configuration, controller 22 may be adapted to provide information associated with the operational steps of 54–68 to a host computer or may be remotely modified by a user of system 10.

Figure 5:
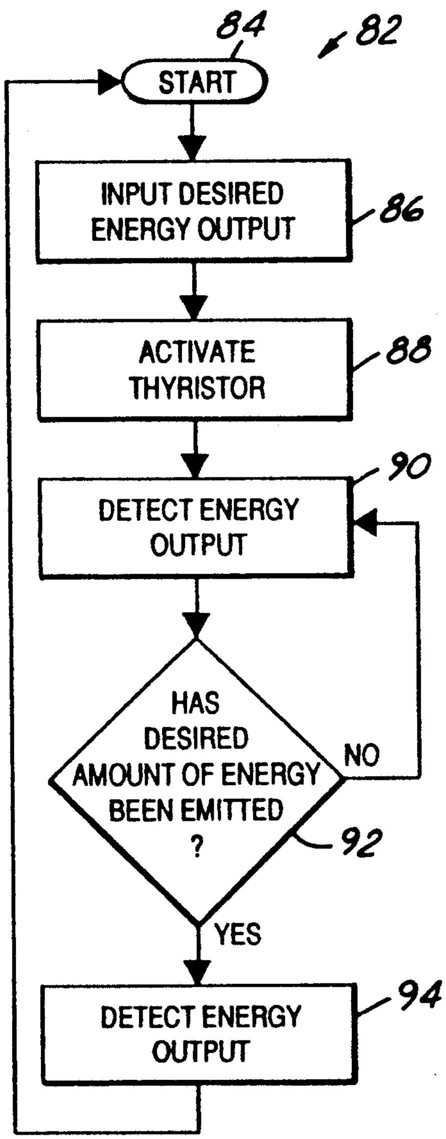
FIG. 5 is a flow chart showing the sequence of steps performed by the system controller of the preferred embodiment of this invention when controlling the amount of light energy emanating from the laser.

The operation of energy detector 42 will now be explained with reference to flow chart 82, of FIG. 5. As shown, flow chart 82 includes an initial step 84 in which all past energy detection levels, associated with detector 42 are cleared or deleted. Step 84 is then followed by step 86 in which a user of system 10 inputs the desired amount of energy to the output from the laser and/or flashlamp 38. Step 86 is then followed by step 88 in which the thyristor 12 is activated, in accordance with the operational steps shown in flow chart 50. Such activation occurs, as previously described, by opening the gate portion of thyristor 12.

Step 88 is then followed by step 90 in which detector 42 is adapted to detect the total amount of light energy emanating from the laser and/or provided to the flashlamp 38. Step 90 is then followed by step 92 in which controller 22 determines whether the desired amount of energy has been emitted or provided. Step 92 is followed by 90 if the desired amount has not yet been reached.

Alternatively, step 92 is followed by step 94 in which system controller 22 deactivates thyristor 12 by preventing the transfer of electrical energy, from power supply 26, to the switch controller 28. Step 94 is then followed by step 84.

In this manner, the total amount of light energy emanating from the laser and/or provided to flashlamp 38 may be constantly monitored and when this amount of energy has been emitted or provided, or has been slightly exceeded, the thyristor 12 is then deactivated in order to prevent further light energy from being emanated. It has been found, that this type of control is far better than the feedback control used in prior pulse delivery systems, since it is accurate and very efficient.

It should be apparent to one of ordinary skill in the art that what has been previously disclosed comprises a universal laser system which can be programmed to operate over a wide range of specifications and may be adapted for use in medical, dental, industrial, military, and scientific applications. The universal laser includes a laser head assembly, laser power supply, and laser pulse modulator all controlled by a microprocessor controller permitting operation at pulse rates from single shot on-demand to 10,000 hertz and/or continuous-wave operation at average power outputs of from zero to 200 watts from single-phase primary power. Further, the disclosed universal laser system is portable, weighting less than 300 pounds, small in size and easily moved from location to location. This unique universal laser system is made possible through the judicious combination of efficient laser head assemblies powered by a unique gated-turn-off thyristor modulator with power supplied by an efficient direct current power source which is relatively insensitive to input voltage and frequency variations. This laser system incorporates a small efficient cooling system specifically designed to cool the efficient head assembly without introducing contaminants without requiring de-ionizing filters or the like. Primary cooling can be either water-to-air or water-to-water as required by the power and/or duty cycle of the specific application. Further, primary power for this universal laser system can be from 100 to 400 VAC, 50 to 60 cycle with power consumption from zero to 5 KVA.

The above basic system has as its core, a microprocessor software package which permits almost unlimited permutations of laser operational parameters in subsequent versions. In effect, the above described pulse forming and delivery system in conjunction with the microprocessor and software package permits one to vary the output and control specifications of the basic laser system to correspond to a wide range of demands, thereby permitting one basic system to fill the needs of tens of applications as opposed to requiring a separate system for each application.

It is to the advantage of the invention is not limited to the exact construction illustrated and described above, but the various changes and modifications may be made without departing from the spirit and scope of the invention, as defined on the following claims. Moreover, it should also be apparent to one of ordinary skill in the art that the sequence of steps associated with flow chart 50 and 82 may be modified as desired and that all such modifications are deemed to be with the scope of this invention.

I claim:

1. A pulse forming and delivery system for use in combination with a flashlamp comprising:

capacitor means for storing electrical energy;

thyristor means having an input coupled to said capacitor for allowing said stored electrical energy to be transferred from said capacitor means to said flashlamp; and controller means coupled to said thyristor means for allowing said thyristor means to transfer said stored electrical energy to said flashlamp for a fixed period of time.

2. The pulse forming and delivery system of claim 1 further comprising simmer current means, coupled to said flash for supplying a simmier current to said flashlamp.

3. The pulse forming and delivery system of claim 1 further comprising power supply means, coupled to said capacitor means, for providing electrical energy to said capacitor means.

4. The pulse forming and delivery system of claim 1 wherein said flashlamp receives said transferred electrical energy and emits light energy for said fixed period of time, said pulse forming and delivery system further comprising energy detector means, coupled to said controller, for measuring the amount of energy emitted by said laser and or provided to said flashlamp and for communicating said measured amount to said controller.

5. The pulse forming and delivery system of claim 1 further comprising monitoring means, coupled to said capacitor means for limiting the amount of electrical energy stored by said capacitor means.

6. A pulsed laser comprising:

a flashlamp adapted to receive a pulse of energy and thereafter to produce light energy therefrom;

capacitor means, coupled to said flashlamp for storing electrical energy;

thyristor means, coupled to said capacitor means and to said flashlamp, for transferring a pulse of stored electrical energy to said flashlamp;

7. The pulsed laser of claim 6 further comprising simmer current means, coupled to said flashlamp for supporting a simmer current to said flashlamp.

8. The pulsed laser of claim 6 further comprising power supply means, coupled to said capacitor means, for providing electrical energy to said capacitor means.

9. The pulsed laser of claim 6 further comprising energy detector means, coupled to said thyristor means, for measuring the amount of energy emitted by said laser and/or provided to said flashlamp and for communicating said measured amount to said controller.

10. The pulsed laser of claim 6 further comprising monitoring means coupled to said capacitor means for limiting the amount of electrical energy stored by said capacitor means.

11. A method for delivering a pulse of electrical energy to a flashlamp, said method comprising the steps of:

providing a thyristor;

coupling the cathode portion of said thyristor to said flashlamp coupling the anode portion of said thyristor to a first source of electrical energy;

coupling the gate portion of said thyristor to a second source of electrical energy for a predetermined period of time thereby, allowing a pulse of electrical energy, emanating from said first source of electrical energy to be delivered to said flashlamp.

12. The method of claim 11 further comprising the step of providing a simmer current to said flashlamp.

13. The method of claim 11 further comprising the steps of monitoring the amount of energy delivered to said flashlamp;

defining a certain and desired amount of electrical energy;

comparing said measured amount with said certain and desired amount; and preventing said delivery of said pulse of electrical energy to said flashlamp after said measured amount exceeds said certain and desired amount of electrical energy.

* * * * *